United States Patent
Yi et al.

(10) Patent No.: US 10,251,171 B2
(45) Date of Patent: Apr. 2, 2019

(54) METHOD FOR ALLOCATING UPLINK RESOURCES IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR); Sungjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/786,293

(22) PCT Filed: May 2, 2014

(86) PCT No.: PCT/KR2014/003939
§ 371 (c)(1),
(2) Date: Oct. 22, 2015

(87) PCT Pub. No.: WO2014/185648
PCT Pub. Date: Nov. 20, 2014

(65) Prior Publication Data
US 2016/0105877 A1    Apr. 14, 2016

Related U.S. Application Data

(60) Provisional application No. 61/823,404, filed on May 15, 2013.

(51) Int. Cl.
*H04W 72/04* (2009.01)
*H04W 72/12* (2009.01)
(Continued)

(52) U.S. Cl.
CPC ..... *H04W 72/044* (2013.01); *H04W 28/0278* (2013.01); *H04W 28/085* (2013.01);
(Continued)

(58) Field of Classification Search
CPC .................................................. H04W 72/044
See application file for complete search history.

(56) References Cited

U.S. PATENT DOCUMENTS

2008/0205323 A1    8/2008    Kaneko et al.
2010/0284314 A1    11/2010   Pelletier et al.
(Continued)

FOREIGN PATENT DOCUMENTS

| CN | 101843157 | 9/2010 |
| CN | 101932004 | 12/2010 |

(Continued)

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 11)," 3GPP TS 36.321 V11.2.0, Mar. 2013, 56 pages.
(Continued)

*Primary Examiner* — John D Blanton
(74) *Attorney, Agent, or Firm* — Lee Hong Degerman Kang Waimey

(57) ABSTRACT

The present invention relates to a wireless communication system. More specifically, the present invention relates to a method and a device for allocating uplink resources in the wireless communication system, the method comprising: transmitting, by a first eNB to a second eNB, uplink (UL) resource allocation information for a user equipment (UE) connected with both the first eNB and the second eNB; receiving, by a first eNB from the UE, buffer size informa-
(Continued)

tion; allocating one or more UL resources to the UE, by considering both of the buffer size information and the UL resource allocation information, wherein the UL resource allocation information indicates a ratio of the buffer size to be considered in each eNB.

10 Claims, 10 Drawing Sheets

(51) Int. Cl.
*H04W 28/02* (2009.01)
*H04W 28/08* (2009.01)
*H04W 84/04* (2009.01)
*H04W 92/20* (2009.01)

(52) U.S. Cl.
CPC ... *H04W 72/1205* (2013.01); *H04W 72/1284* (2013.01); *H04W 84/045* (2013.01); *H04W 92/20* (2013.01)

(56) References Cited

U.S. PATENT DOCUMENTS

| | | | |
|---|---|---|---|
| 2010/0329135 | A1 | 12/2010 | Pelletier et al. |
| 2011/0292873 | A1 | 12/2011 | Guo |
| 2011/0310800 | A1 | 12/2011 | Lin et al. |
| 2012/0093121 | A1 | 4/2012 | Zhang |
| 2013/0028223 | A1 | 1/2013 | Kim et al. |
| 2014/0126399 | A1* | 5/2014 | Damnjanovic ... H04W 72/1252 370/252 |
| 2015/0244429 | A1* | 8/2015 | Zhang ............... H04B 7/024 370/329 |
| 2015/0312957 | A1* | 10/2015 | Pelletier ............. H04W 74/04 370/329 |
| 2015/0358838 | A1 | 12/2015 | Wei et al. |
| 2016/0050054 | A1 | 2/2016 | Wager et al. |
| 2016/0050707 | A1 | 2/2016 | Li et al. |
| 2016/0066241 | A1 | 3/2016 | Wu et al. |
| 2016/0088647 | A1 | 3/2016 | Yi et al. |
| 2016/0128046 | A1 | 5/2016 | Sebire et al. |

FOREIGN PATENT DOCUMENTS

| | | |
|---|---|---|
| CN | 101938840 | 1/2011 |
| CN | 102202343 | 9/2011 |
| CN | 102217365 | 10/2011 |
| CN | 102348292 | 2/2012 |
| CN | 102934505 | 2/2013 |
| EP | 2391172 | 11/2011 |
| EP | 2854444 | 4/2015 |
| JP | 2014138386 | 7/2014 |
| WO | 2009088334 | 7/2009 |
| WO | 2011100492 | 8/2011 |
| WO | 2013182035 | 12/2013 |

OTHER PUBLICATIONS

PCT International Application No. PCT/KR2014/003939, Written Opinion of the International Searching Authority dated Aug. 18, 2014, 9 pages.
Ericsson, "Stage 3 Text Proposal for BSR Calculation," TSG-RAN WG2 Meeting #61, R2-080933, Feb. 2008, 3 pages.
PCT International Application No. PCT/KR2014/003937, Written Opinion of the International Searching Authority dated Aug. 18, 2014, 9 pages.
European Patent Office Application Serial No. 14798612.9, Search Report dated Nov. 17, 2016, 9 pages.
European Patent Office Application Serial No. 14979801.9, Search Report dated Nov. 17, 2016, 10 pages.
Nokia Siemens Networks,"Data split options and considerations on U-plane protocol architecture for dual-connectivity" 3GPP TSG-RAN WG2 #81bis, R2-131054, Apr. 2013, 10 pages.
Renesas Mobile Europe,"Protocol architecture for dual connectivity" 3GPP TSG-RAN WG2 #81bis, R2-131174, Apr. 2013, 8 pages.
Alcatel-Lucent Alcatel-Lucent Shanghai Bell,"MAC and PHY modifications required for dual connectivity support" 3GPP TSG-RAN WG2 #82, R2-131964, May 2013, 4 pages.
Renesas Mobile Europe,"Protocol impact of dual connectivity for UE and eNB" 3GPP TSG-RAN WG2 #82, R2-131847, May 2013, 5 pages.
LG Electronics Inc.,"BSR Impacts by Bearer Split" 3GPP TSG-RAN WG2 #83, R2-132583, Aug. 2013, 4 pages.
Panasonic,"BSR Reporting Options for Dual Connectivity" 3GPP TSG-RAN WG2 #84, R2-133935, Nov. 2013, 4 pages.
Nokia Siemens Networks(Rapporteur),"Email Discussion Report on U-Plane Alternatives [81bis#19]" 3GPP TSG-RAN WG2 #82, R2-131621, May 2013, 40 pages.
Alcatel-Lucent Shanghai Bell,"MAC and PHY modifications required for dual connectivity support" 3GPP TSG-RAN WG2 #82, R2-131964, May 2013, 4 pages.
The State Intellectual Property Office of the People's Republic of China Application Serial No. 201480028293.2, Office Action dated Nov. 6, 2017, 7 pages.
U.S. Appl. No. 14/786,115, Office Action dated Jun. 16, 2017, 21 pages.
U.S. Appl. No. 14/786,115, Final Office Action dated Jan. 23, 2018, 13 pages.
The State Intellectual Property Office of the People's Republic of China Application Serial No. 201480028369.1, Office Action dated Jan. 31, 2018, 5 pages.
U.S. Appl. No. 14/786,115, Notice of Allowance dated May 25, 2018, 12 pages.
European Patent Office Application Serial No. 14797801.9, Office Action dated Sep. 25, 2018, 7 pages.

* cited by examiner

METHOD FOR ALLOCATING UPLINK RESOURCES IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2014/003939, filed on May 2, 2014, which claims the benefit of U.S. Provisional Application No. 61/823,404, filed on May 15, 2013, the contents of which are all hereby incorporated by reference herein in their entirety.

TECHNICAL FIELD

The present invention relates to a wireless communication system and, more particularly, to a method for allocating uplink resources and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for allocating uplink resource in a wireless communication system. The technical problems solved by the present invention are not limited to the above technical problems and those skilled in the art may understand other technical problems from the following description.

Technical Solution

The object of the present invention can be achieved by providing a method for operating by an evolved-Node B in wireless communication system, the method comprising; transmitting, by a first eNB to a second eNB, uplink (UL) resource allocation information for a user equipment (UE) connected with both the first eNB and the second eNB; receiving, by the first eNB, buffer size information from the UE; and allocating, by the first eNB, one or more UL resources to the UE by considering both of the buffer size information and the UL resource allocation information, wherein the UL resource allocation information indicates a ratio of the buffer size to be considered in each eNB.

In another aspect of the present invention, a method for an evolved-Node B in wireless communication system, the method comprising; receiving, by a second eNB from a first eNB, uplink (UL) resource allocation information for a user equipment (UE) connected with both the first eNB and the second eNB; receiving, by the second eNB, buffer size information from the UE; and allocating, by the second eNB, one or more UL resources to the UE by considering both of the buffer size information and the UL resource allocation information, wherein the UL resource allocation information indicates a ratio of the buffer size to be considered in the second eNB.

In another aspect of the present invention, provided herein is an evolved-Node B in the wireless communication system, the eNB comprising: an RF (radio frequency) module; and a processor configured to control the RF module, wherein the processor is configured to transmit uplink (UL) resource allocation information to a second eNB for a user equipment (UE) connected with both the first eNB and the second eNB, to receive buffer size information from the UE, to allocate one or more UL resources to the UE by considering both of the buffer size information and the UL resource allocation information, wherein the UL resource allocation information indicates a ratio of the buffer size to be considered in each eNB.

Preferably, said transmitting comprising transmitting the UL resource allocation information through an X2 interface.

Preferably, the ratio of the buffer size is configured per radio bearer comprising one Packet Data Convergence Protocol (PDCP) entity, two Radio Link Control (RLC) entities and two Medium Access Control (MAC) entities for one direction.

Preferably, the buffer size information comprises amount of data available for transmission in a Packet Data Convergence Protocol (PDCP) entity and amount of data available for transmission in a Radio Link Control (RLC) entity.

Preferably, a first type cell including the first eNB provides service to a first area larger than a second area served by a second cell including the second eNB.

It is to be understood that both the foregoing general description and the following detailed description of the present invention are exemplary and explanatory and are intended to provide further explanation of the invention as claimed.

Advantageous Effects

According to the present invention, allocating resources can be efficiently performed in a wireless communication system. Specifically, the eNB (evolved-Node B) can allocates UL resources by considering both a ratio of a buffer size to be considered in each eNB and buffer size information reported by the UE.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
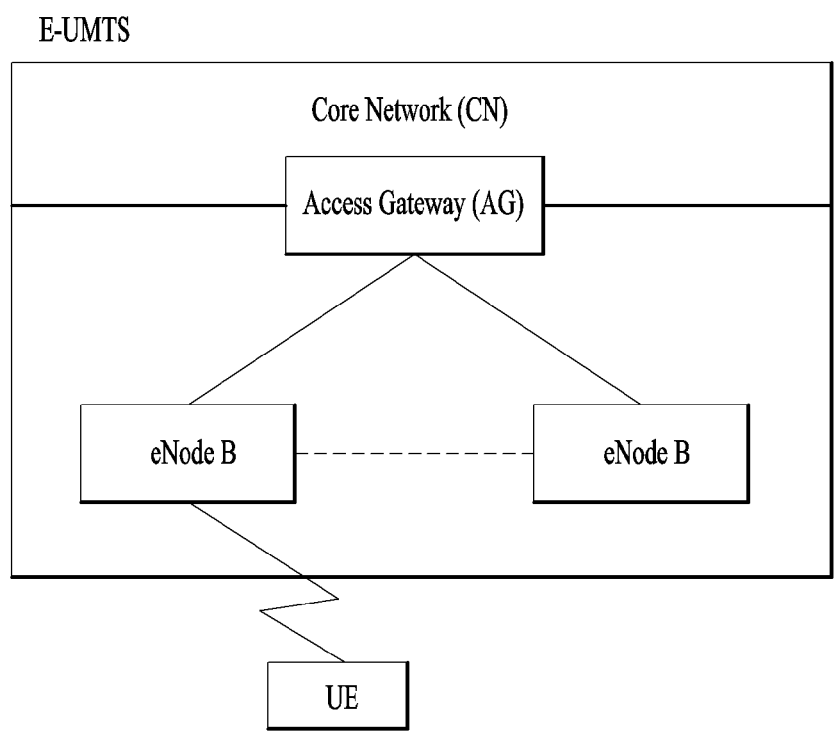
FIG. 1 is a diagram showing a network structure of an Evolved Universal Mobile Telecommunications System (E-UMTS) as an example of a wireless communication system.
Figure 2A:
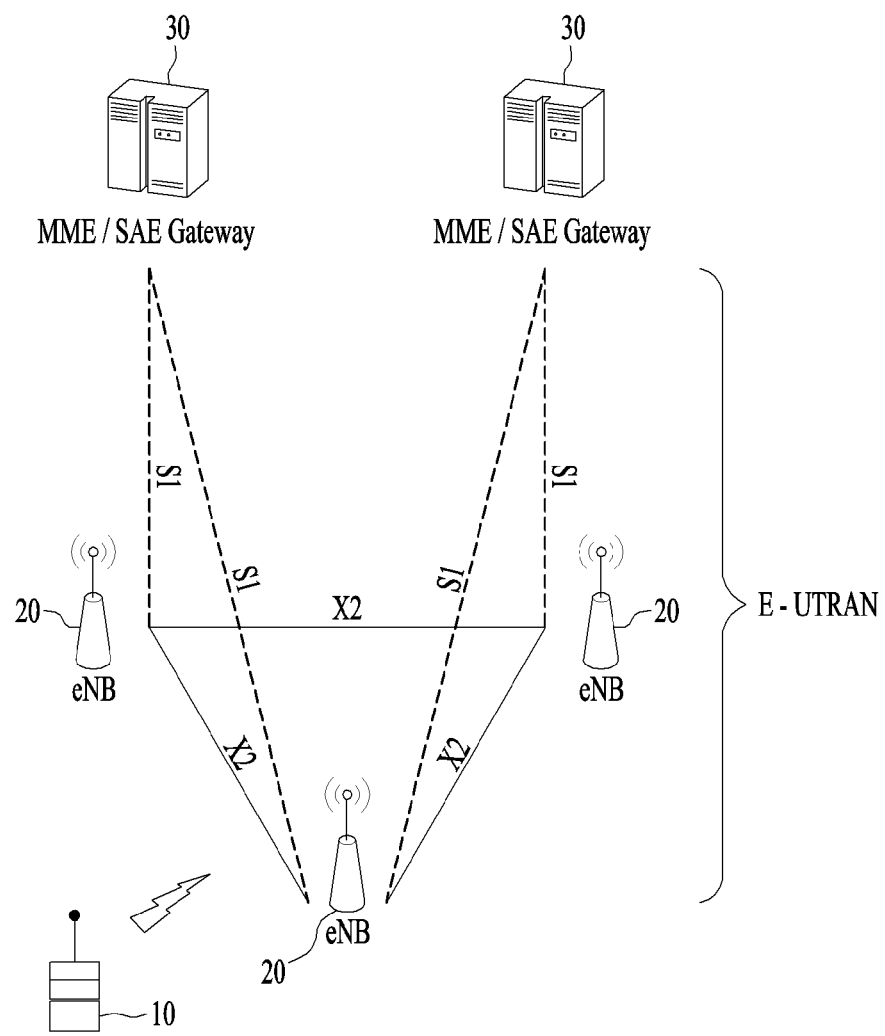
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
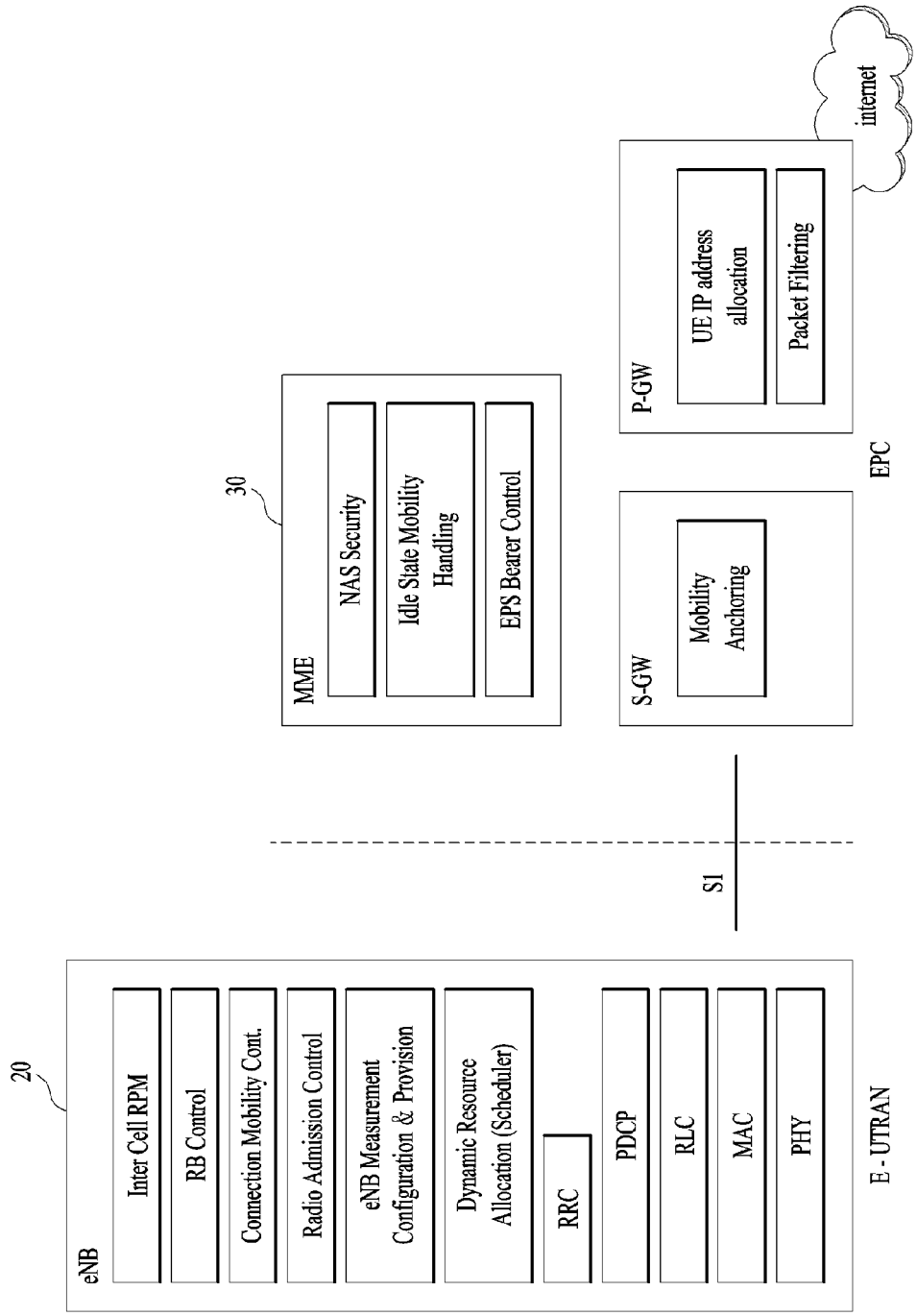
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3A:
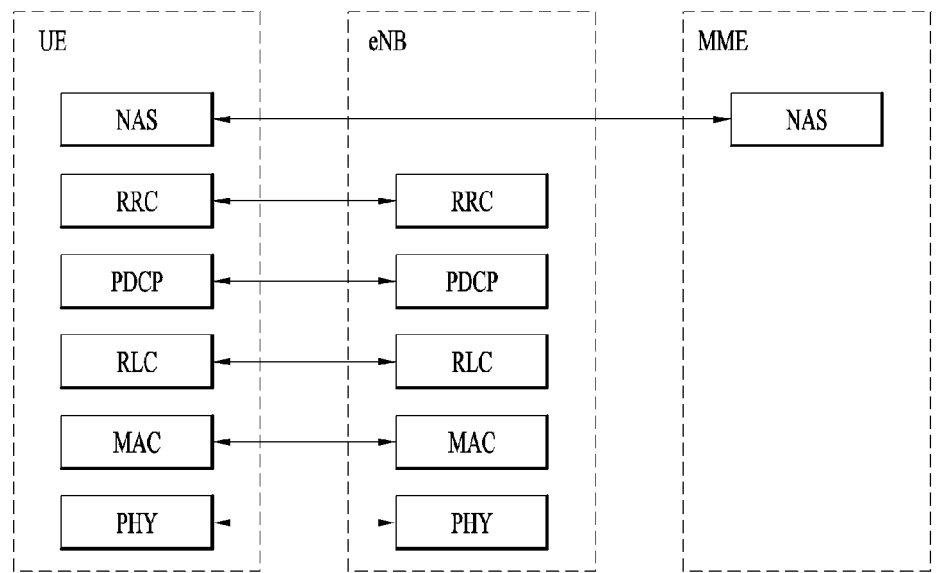
FIG. 3A is a diagram showing a control plane of a radio interface protocol between a UE and an E-UTRAN based on a 3rd generation partnership project (3GPP) radio access network standard and FIG. 3B is a diagram showing a user plane of a radio interface protocol between a UE and an E-UTRAN based on a 3GPP radio access network standard.
Figure 3B:
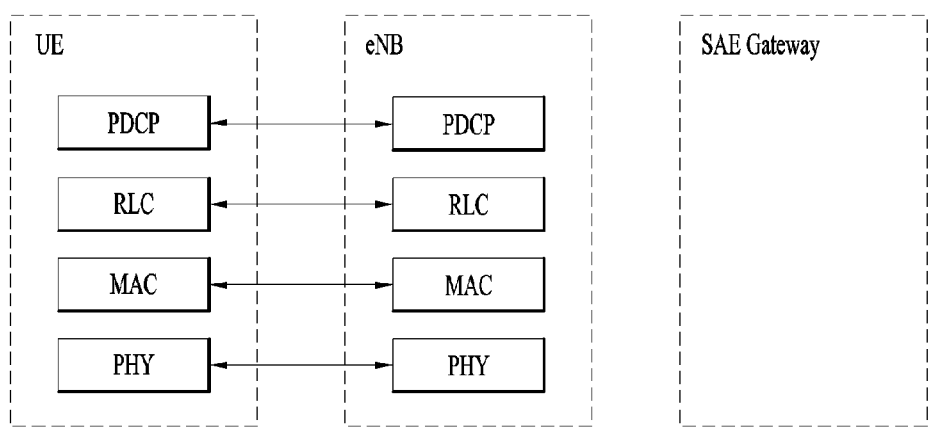

FIGS. 3A and 3B are area diagrams showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
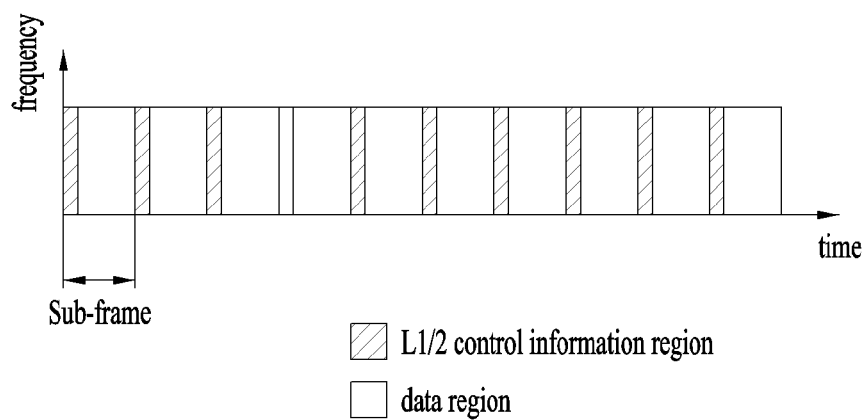
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
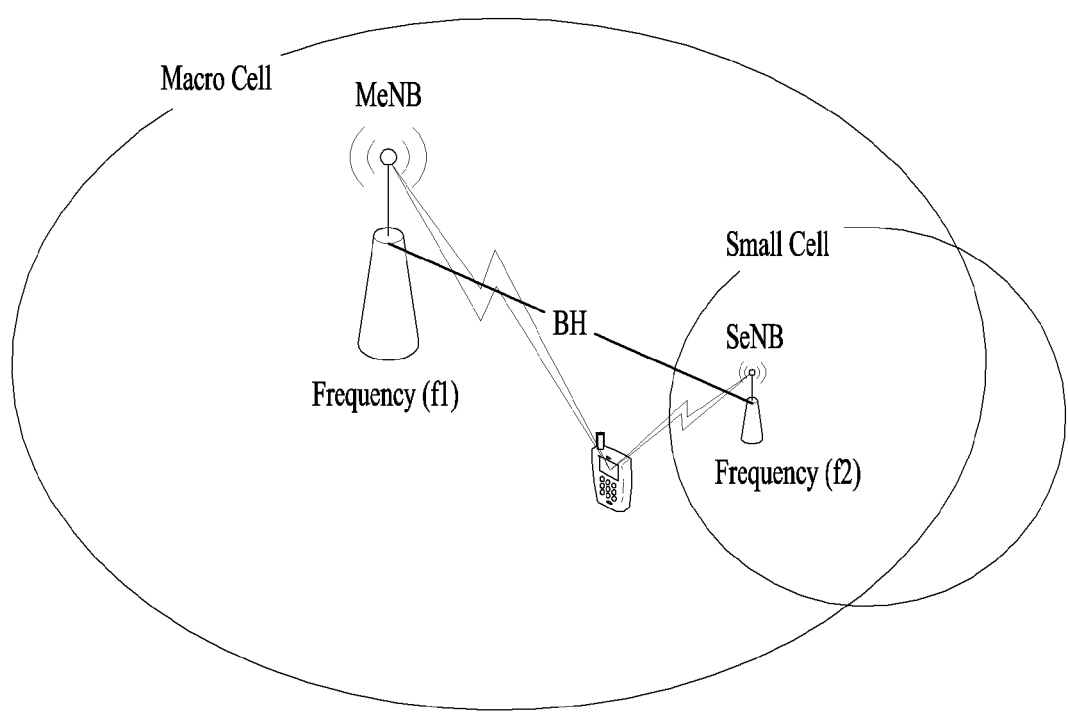
FIG. 5 is a conceptual diagram for dual connectivity between a macro cell and a small cell.

FIG. 5 is a conceptual diagram for dual connectivity between a macro cell and a small cell.

In the next system of LTE-A, a plurality of small cells (e.g, micro cell, pico cell etc.) may be present in a big cell (e.g. macro cell) having larger coverage than the small cells for optimization of data traffic, etc. For example, a macro cell and a micro cell may be combined for one user equipment (e.g. the dual connectivity). If the macro cell is used for managing mobility of the UE mainly (e.g. PCell) and the micro cell is used for boosting throughput mainly in this situation (e.g. SCell), the plurality of cells combined to the UE have different coverage each other. And each of cells can be managed by each of base stations. The base stations may be geographically separated (inter-site CA).

The dual connectivity means that the UE can be connected to both the macro cell and the small cell at the same time. With dual connectivity, some of the data radio bearers (DRBs) can be offloaded to the small cell to provide high throughput while keeping scheduling radio bearers (SRBs) or other DRBs in the macro cell to reduce the handover possibility. The macro cell is operated by MeNB (Macro cell eNB) via the frequency of f1, and the small cell is operated by SeNB (Small cell eNB) via the frequency of f2. The frequency f1 and f2 may be equal. The backhaul interface (BH) between MeNB and SeNB is non-ideal, which means that there is considerable delay in the backhaul and therefore the centralized scheduling in one node is not possible.

To benefit from the dual connectivity, the best-effort traffic which is delay tolerant is offloaded to small cell while the other traffic, e.g SRBs or real-time traffic, is still serviced by the macro cell.

Figure 6A:
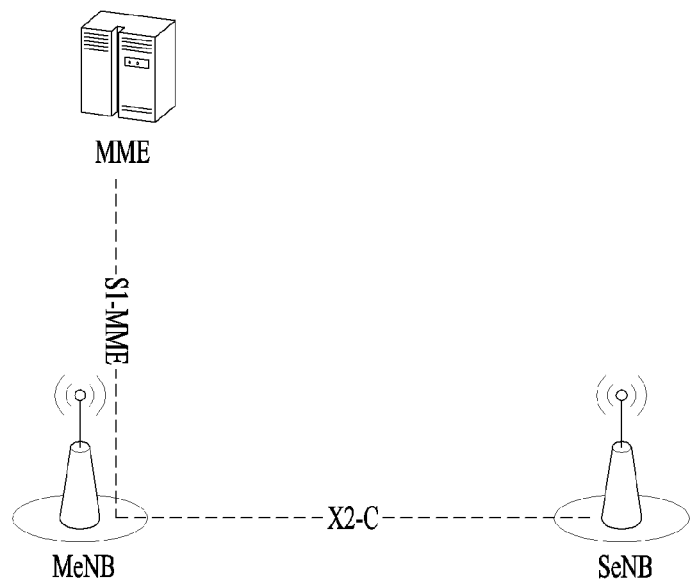
FIG. 6A is a conceptual diagram for C-Plane connectivity of base stations involved in dual connectivity.

FIG. 6A shows C-plane (Control Plane) connectivity of eNBs involved in dual connectivity for a certain UE: The MeNB is C-plane connected to the MME via S1-MME (S1 for the control plane), the MeNB and the SeNB are interconnected via X2-C(X2-Control plane). As FIG. 6A, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell (Primary Cell) to some UEs while providing SCell(s) (Secondary Cells) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 6B:
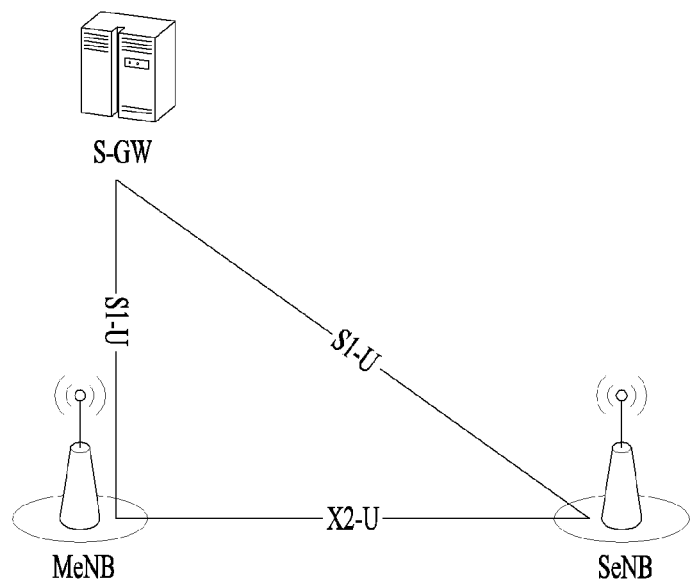
FIG. 6B is a conceptual diagram for U-Plane connectivity of base stations involved in dual connectivity.

FIG. 6B shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 7:
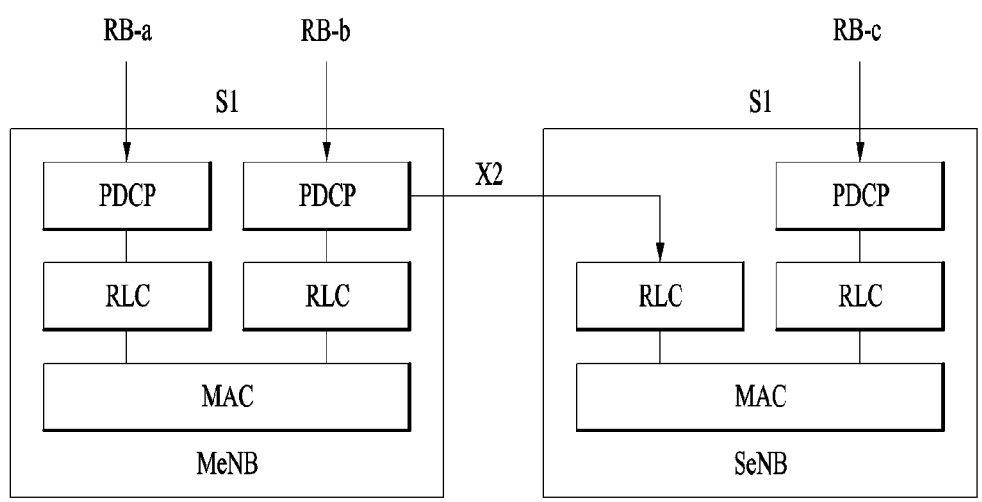
FIGS. 7 and 8 are conceptual diagrams for radio protocol architecture for dual connectivity.

FIG. 7 is a conceptual diagram for radio protocol architecture for dual connectivity.

E-UTRAN of the present example can support dual connectivity (DC) operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity (DC) operation, the radio protocol architecture that a particular bearer uses depends on how the bearer is setup. Three alternatives exist, MCG (Master Cell Group) bearer (RB-a), split bearer (RB-b) and SCG (Secondary Cell Group) bearer (RB-c). Those three alternatives are depicted on FIG. 7. The SRBs (Signaling Radio Bearers) are always of the MCG bearer and therefore only use the radio resources provided by the MeNB. The MCG (Master Cell Group) bearer (RB-a) is a radio protocol only located in the MeNB to use MeNB resources only in the dual connectivity. And the SCG (Secondary Cell Group) bearer (RB-c) is a radio protocol only located in the SeNB to use SeNB resources in the dual connectivity.

Specially, the split bearer (RB-b) is a radio protocol located in both the MeNB and the SeNB to use both MeNB and SeNB resources in the dual connectivity and the split bearer (RB-b) may be a radio bearer comprising one Packet Data Convergence Protocol (PDCP) entity, two Radio Link Control (RLC) entities and two Medium Access Control (MAC) entities for one direction.

Specially, the dual connectivity (DC) operation can also be described as having at least one bearer configured to use radio resources provided by the SeNB.

Figure 8:
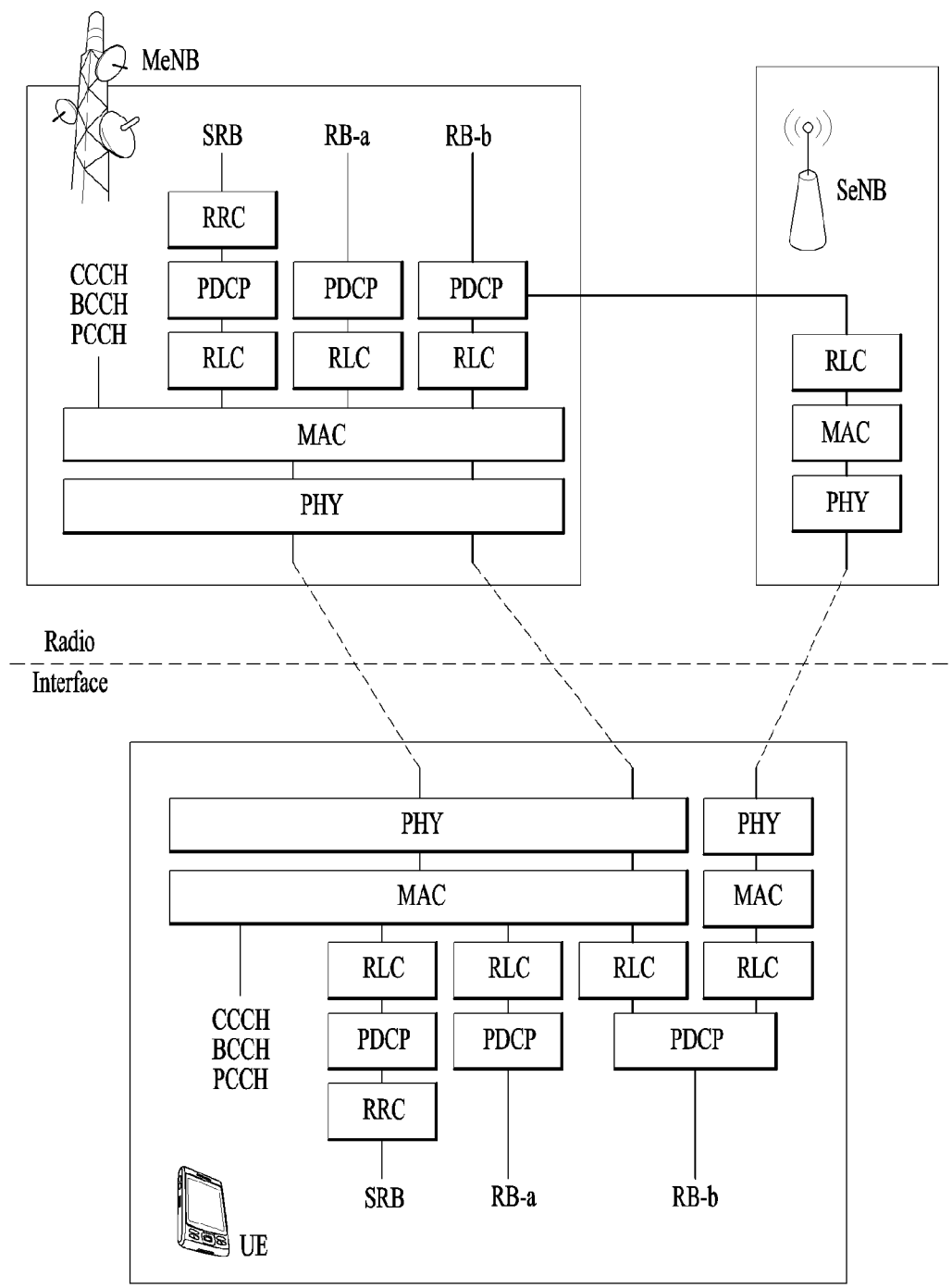

FIG. 8 is a conceptual diagram for radio protocol architecture for dual connectivity.

'Data available for transmission' is defined in PDCP and RLC layers to be used for Buffer Status Reporting (BSR), Logical Channel Prioritization (LCP), and Random Access Preamble Group (RAPG) selection in MAC layer.

For the purpose of MAC buffer status reporting, the UE may consider the following as data available for transmission in the RLC layer:
  RLC SDUs (Service Data Unit), or segments thereof, that have not yet been included in an RLC data PDU (Protocol Data Unit);
  RLC data PDUs, or portions thereof, that are pending for retransmission (RLC AM).

In addition, if a STATUS PDU has been triggered and t-StatusProhibit is not running or has expired, the UE may estimate the size of the STATUS PDU that will be transmitted in the next transmission opportunity, and consider this as data available for transmission in the RLC layer.

Meanwhile, for the purpose of MAC buffer status reporting, the UE may consider PDCP Control PDUs, as well as the following as data available for transmission in the PDCP layer:
  For SDUs for which no PDU has been submitted to lower layers:
    the SDU itself, if the SDU has not yet been processed by PDCP, or
    the PDU if the SDU has been processed by PDCP.

In addition, for radio bearers that are mapped on RLC AM, if the PDCP entity has previously performed the re-establishment procedure, the UE may also consider the following as data available for transmission in the PDCP layer:
  For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:
    the SDU, if it has not yet been processed by PDCP, or
    the PDU once it has been processed by PDCP.

In the prior art, there are only one PDCP entity and one RLC entity for one direction (i.e. uplink or downlink) in a Radio Bearer, and thus, when the UE calculates 'data available for transmission', it just sums up the data available for transmission in PDCP and that in RLC. In LTE Rel-12, however, a new study on Small Cell Enhancement is started, where the dual connectivity is supported.

To support dual connectivity, one of the potential solutions is for the UE to transmit data to both Macro cell and Small cell utilizing a new RB structure called dual RLC/MAC scheme, where a single RB has one PDCP entity, two RLC entities and two MAC entities for one direction, and RLC/MAC pair is configured for each cell, as shown in FIG. 8. In the FIG. 8, RB-B is called as "split Radio Bearer" and stands for DRB for Best Effort traffic.

Buffer Status Reporting (BSR)

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signalling logicalChannelGroup which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:
  UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
  UL resources are allocated and number of padding bits is equal to or larger than the size of the Buffer Status Report MAC control element plus its subheader, in which case the BSR is referred below to as "Padding BSR";
  retxBSR-Timer expires and the UE has data available for transmission for any of the logical channels which belong to a LCG, in which case the BSR is referred below to as "Regular BSR";
  periodicBSR-Timer expires, in which case the BSR is referred below to as "Periodic BSR".

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Logical Channel Prioritization (LCP)

The Logical Channel Prioritization procedure is applied when a new transmission is performed. RRC may control the scheduling of uplink data by signaling for each logical channel: priority where an increasing priority value indicates a lower priority level, prioritisedBitRate which sets the Prioritized Bit Rate (PBR), bucketSizeDuration which sets the Bucket Size Duration (BSD).

The UE may maintain a variable Bj for each logical channel j. Bj may be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it may be set to the bucket size. The bucket size of a logical channel is equal to PBR×BSD, where PBR and BSD are configured by upper layers.

Random Access Preamble Group (RAPG) selection

The Random Access Resource selection procedure may be performed as follows:

If ra-PreambleIndex (Random Access Preamble) and ra-PRACH-MaskIndex (PRACH Mask Index) have been explicitly signalled and ra-PreambleIndex is not 000000: the Random Access Preamble and the PRACH Mask Index are those explicitly signalled.

else the Random Access Preamble may be selected by the UE as follows:

i) if Msg3 has not yet been transmitted, the UE may, and if Random Access Preambles group B exists and if the potential message size (data available for transmission plus MAC header and, where required, MAC control elements) is greater than messageSizeGroupA and if the pathloss is less than PCMAX,c (of the Serving Cell performing the Random Access Procedure)−preambleInitialReceivedTargetPower−deltaPreambleMsg3−messagePowerOffsetGroupB, then UE may select the Random Access Preambles group B;

ii) else: the UE may select the Random Access Preambles group A.

In this case, the MAC functions addressed above, i.e. BSR, LCP, and RAPG selection, are performed in each MAC, since the UL resource scheduling node is located in different node in the network side, i.e. one in MeNB and the other in SeNB.

The problem is how to use the information 'data available for transmission in PDCP' in the MAC functions. If each MAC utilizes the same information of 'data available for transmission in PDCP', both the MeNB and the SeNB would allocate UL resource that can cope with 'data available for transmission in PDCP', in which case the 'data available for transmission in PDCP' is considered twice, and it leads to wastage of radio resource.

Figure 9:
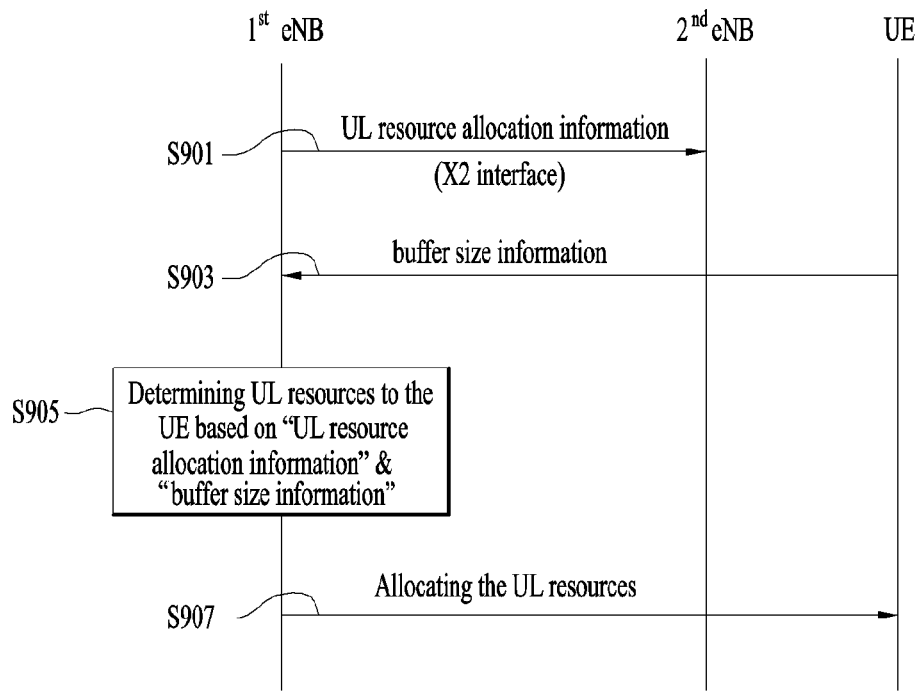
FIGS. 9 and 10 are conceptual diagrams for allocating UL resources according to embodiments of the present invention.

FIG. 9 is a conceptual diagram for allocating UL resources according to embodiments of the present invention.

To prevent the MeNB and SeNB to over-allocate the UL resource to the UE having dual RLC/MAC scheme, it is invented that the BS calculates and allocates UL resources by considering both a ratio of a buffer size to be considered in each eNB and buffer size information reported by the UE.

The first eNB may transmit to a second eNB, uplink (UL) resource allocation information for a user equipment (UE) connected with both the first eNB and the second eNB (S901).

Desirably, the first eNB may be the macro (or master) eNB in a macro cell and the second eNB may be the small (or secondary) eNB in a small cell. A coverage of the macro cell is lager that a coverage of the small cell. As mentioned earlier, the UE may be connected to both the macro cell and the small cell at the same time. And a plurality of small cells (e.g, micro cell, pico cell etc.) may be present in a big cell (e.g. macro cell) having larger coverage than the small cells for optimization of data traffic, etc.

Desirably, the UL resource allocation information can be shared between the first eNB and second eNB. An X2 signaling can be defined to transport the UL resource allocation information between them. The X2 signaling means a signaling using an X2 interface between the first eNB and second eNB.

Desirably, the UL resource allocation information indicates a ratio of the buffer size to be considered in each eNB.

Specially, the UL resource allocation information may include transmission rate (TR) information. The TR may define the ratio of "amount of PDCP data transmitted to a 1st RLC entity" to "amount of PDCP data transmitted to a 2nd RLC entity" where the 1st RLC entity and the 2nd RLC entity are connected to the PDCP entity on one direction.

The indication information can be a form of ratio "DATP-M:DATP-S", or percentile amount of DATP-S compared to DATP-M, or vice versa, or any type of information that indicates the amount of data that can be used to divide the DATP to DATP-M and DATP-S. Here, the 'DATP-M' means amount of data available for transmission in PDCP entity for a Macro cell MAC, and 'DATP-S means amount of data available for transmission in PDCP entity for a Small cell MAC.

Desirably, the ratio of the buffer size may be configured per a radio bearer comprising one Packet Data Convergence Protocol (PDCP) entity, two Radio Link Control (RLC) entities and two Medium Access Control (MAC) entities for one direction.

The first eNB may receive from the UE, buffer size information (S903). In this case, there is no difference from the prior art in UE behavior regarding calculation of DATP. Thus, the UE may report DATP as in the prior art, i.e. the UE does not divide DATP to DATP-M and DATP-S.

Desirably, the buffer size information may comprise amount of data available for transmission in a PDCP entity (DATP) and amount of data available for transmission in a RLC entity (DATR). In this case, the first eNB can receive from the UE, the DATP and DATR-M. Here, the 'DATR-M' means amount of data available for transmission in RLC entity for a Macro cell MAC.

The first eNB may determine and allocate one or more UL resources to the UE, by considering both of the buffer size information and the UL resource allocation information (S905-S907).

Figure 10:
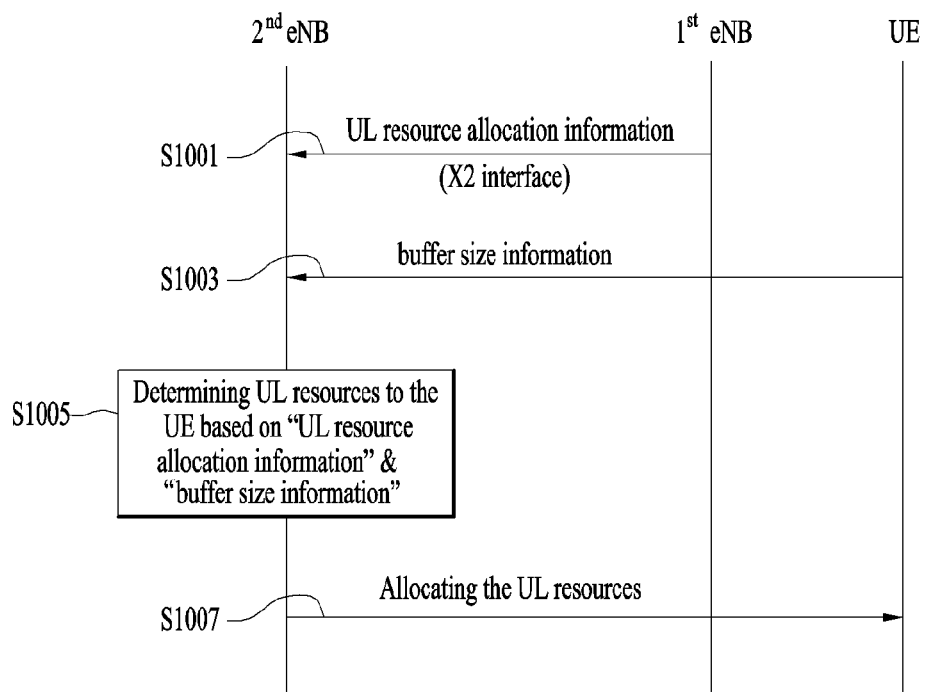

FIG. 10 is another conceptual diagram for allocating UL resources according to embodiments of the present invention.

The second eNB may receive from a first eNB, uplink (UL) resource allocation information for a user equipment (UE) connected with both the first eNB and the second eNB (S901).

Desirably, the first eNB may be the macro (or master) eNB in a macro cell and the second eNB may be the small (or secondary) eNB in a small cell. A coverage of the macro cell is lager that a coverage of the small cell. As mentioned earlier, the UE may be connected to both the macro cell and the small cell at the same time. And a plurality of small cells (e.g, micro cell, pico cell etc.) may be present in a big cell (e.g. macro cell) having larger coverage than the small cells for optimization of data traffic, etc.

Desirably, the UL resource allocation information can be shared between the first eNB and second eNB. An X2 signaling can be defined to transport the UL resource allocation information between them. The X2 signaling means a signaling using an X2 interface between the first eNB and second eNB.

Desirably, the UL resource allocation information indicates a ratio of the buffer size to be considered in each eNB.

Specially, the UL resource allocation information may include transmission rate (TR) information. The TR may define the ratio of "amount of PDCP data transmitted to a 1st RLC entity" to "amount of PDCP data transmitted to a 2nd RLC entity" where the 1st RLC entity and the 2nd RLC entity are connected to the PDCP entity on one direction.

The indication information can be a form of ratio "DATP-M:DATP-S", or percentile amount of DATP-S compared to DATP-M, or vice versa, or any type of information that indicates the amount of data that can be used to divide the DATP to DATP-M and DATP-S. Here, the 'DATP-M' means amount of data available for transmission in PDCP entity for a Macro cell MAC, and 'DATP-S means amount of data available for transmission in PDCP entity for a Small cell MAC.

Desirably, the ratio of the buffer size may be configured per a radio bearer comprising one Packet Data Convergence Protocol (PDCP) entity, two Radio Link Control (RLC) entities and two Medium Access Control (MAC) entities for one direction.

The second eNB may receive from the UE, buffer size information (S1003). In this case, there is no difference from the prior art in UE behavior regarding calculation of DATP. Thus, the UE may report DATP as in the prior art, i.e. the UE does not divide DATP to DATP-M and DATP-S.

Desirably, the buffer size information may comprise amount of data available for transmission in a PDCP entity (DATP) and amount of data available for transmission in a RLC entity (DATR). In this case, the first eNB can receive from the UE, the DATP and DATR-S. Here, the 'DATR-S' means amount of data available for transmission in RLC entity for a Small cell MAC.

The second eNB may determine and allocate one or more UL resources to the UE, by considering both of the buffer size information and the UL resource allocation information (S1005-S1007).

Figure 11:
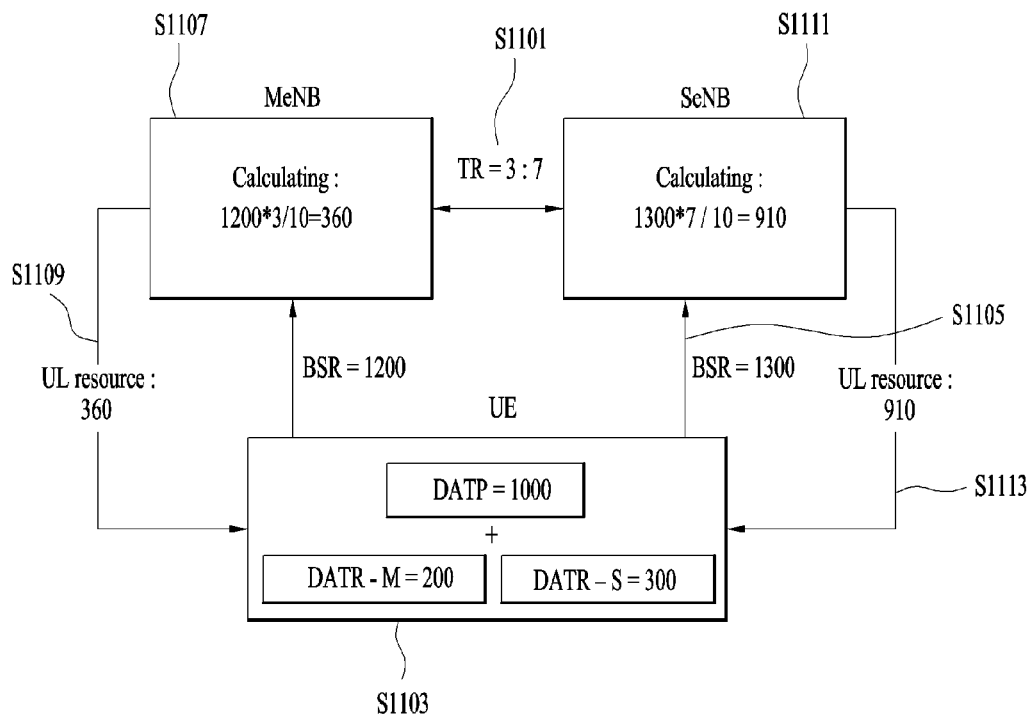
FIG. 11 is conceptual diagram an exemplary allocation of UL resources according to embodiments of the present invention.

FIG. 11 is conceptual diagram an exemplary amount of data available for transmission according to embodiments of the present invention.

An example procedure of this invention is shown in FIG. 11.

The MeNB and SeNB may exchange UL resource allocation information for a radio bearer (RB) via X2 interface signaling (S1101). In this example, the UL resource allocation information indicates the TR being set to 3:7 (S1101).

For the indicated RB, the UE may report its buffer status including DATP=1000 bytes, DATR-M=200 bytes, and DATR-S=300 bytes (S1103). In this example, the UE may report its buffer status indicated as 1200 byte to the MeNB and 1300 byte to the SeNB.

In case of the MeNB, the MeNB may consider only TR fraction (e.g. 3/10) in UL resource allocation (S1107). Thus, the MeNB may allocate UL resource as 360 byte (because, 1200*(3/10)=360) to the UE (S1109).

Similarly, in case of the SeNB, the SeNB may consider only TR fraction (e.g. 7/10) in UL resource allocation (S1111). Thus, the SeNB may allocate UL resource as 910 byte (because, 1300*(7/10)=910) to the UE (S1113).

This embodiment is not accurate because DATR is also divided by TR, but as long as DATR is small, the result would not create a practical problem. All the above mentioned methods can be applied to multiple RLC/MAC schemes, i.e. more than two RLC/MAC pairs. In this case, the TR may be defined for all RLC/MAC pairs.

Figure 12:
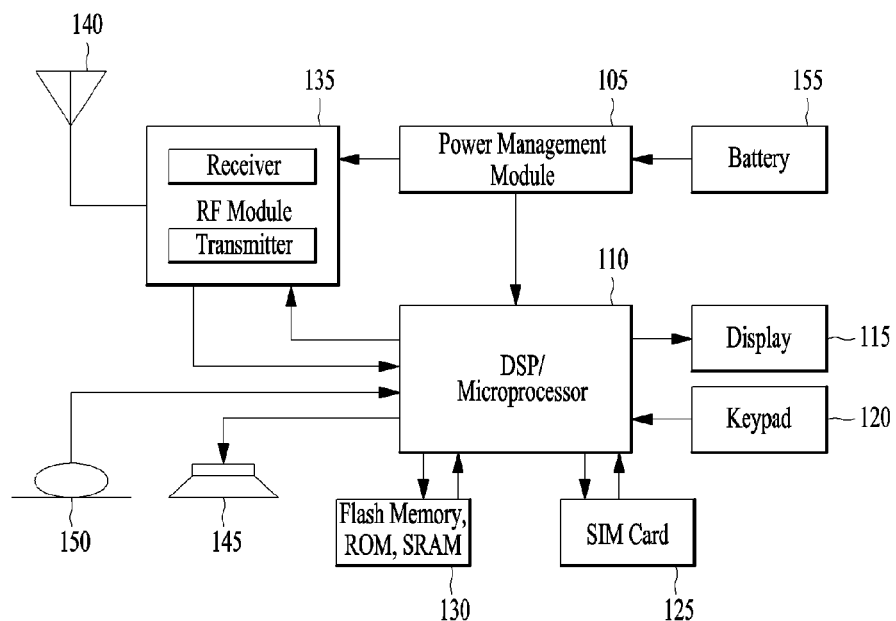
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 12 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
   configuring a Packet Data Convergence Protocol (PDCP) entity, two Radio Link Control (RLC) entities and two Medium Access Control (MAC) entities associated with a split bearer,
   wherein a first RLC entity is associated with a first MAC entity, and a second RLC entity is associated with a second MAC entity, and
   wherein the first MAC entity is for a first evolved-Node B (eNB) and the second MAC entity is for a second eNB;
   when data becomes available for transmission in the PDCP entity, indicating, to the first MAC entity and to the second MAC entity, an amount of data for transmission in the PDCP entity, the amount of data for transmission including data that is common to the first MAC entity and the second MAC entity,
   wherein an amount of data for transmission in the first RLC entity indicated to the first MAC entity and an amount of data for transmission in the second RLC entity indicated to the second MAC entity are not common;
   generating a first buffer status reporting (BSR) for the first eNB with considering the indicated amount of data available for transmission in the PDCP entity and the indicated amount of data available for transmission in the first RLC entity;
   generating a second BSR for the second eNB with considering the indicated amount of data available for transmission in the PDCP entity and the indicated amount of data available for transmission in the second RLC entity;
   transmitting, via the first MAC entity, the first BSR to the first eNB; and
   transmitting, via the second MAC entity, the second BSR to the second eNB.

2. The method according to claim 1, wherein the first eNB corresponds to an eNB of a macro cell and the second eNB corresponds to an eNB of a small cell.

3. The method according to claim 1, wherein a dual connectivity mode is configured for the UE.

4. The method according to claim 1, wherein the first BSR for the first eNB includes the amount of data available for transmission in the first RLC entity which is associated with the first MAC entity, and the second BSR for the second eNB includes the amount of data available for transmission in the second RLC entity which is associated with the second MAC entity.

5. The method according to claim 1, wherein:
   when data becomes available for transmission in the first RLC entity, the first RLC entity indicates to the first MAC entity the amount of data for transmission in the first RLC entity; and
   when data becomes available for transmission in the second RLC entity, the second RLC entity indicates to the second MAC entity the amount of data for transmission in the second RLC entity.

6. A user equipment (UE) operating in a wireless communication system, the UE comprising:
   a radio frequency (RF) module; and
   a processor configured to control the RF module,
   wherein the processor is configured to:
   configure a Packet Data Convergence Protocol (PDCP) entity, two Radio Link Control (RLC) entities and two Medium Access Control (MAC) entities associated with a split bearer,
   wherein a first RLC entity is associated with a first MAC entity, and a second RLC entity is associated with a second MAC entity, and
   wherein the first MAC entity is for a first evolved-Node B (eNB) and the second MAC entity is for a second eNB,
   when data becomes available for transmission in the PDCP entity, indicate, to the first MAC entity and to the second MAC entity, an amount of data for transmission in the PDCP entity, the amount of data for transmission including data that is common to the first MAC entity and the second MAC entity,
   wherein an amount of data for transmission in the first RLC entity indicated to the first MAC entity and an amount of data for transmission in the second RLC entity indicated to the second MAC entity are not common;
   generate a first buffer size reporting (BSR) for the first eNB with considering the indicated amount of data available for transmission in the PDCP entity and the indicated amount of data available for transmission in the first RLC entity;
   generate a second BSR for the second eNB with considering the indicated amount of data available for transmission in the PDCP entity and the indicated amount of data available for transmission in the second RLC entity;
   transmit, via the first MAC entity, the first BSR to the first eNB; and
   transmit, via the second MAC entity, the second BSR to the second eNB.

7. The UE according to claim 6, wherein the first eNB corresponds to an eNB of a macro cell and the second eNB corresponds to an eNB of a small cell.

8. The UE according to claim 6, wherein a dual connectivity mode is configured for the UE.

9. The UE according to claim 6, wherein the first BSR for the first eNB includes the amount of data available for transmission in the first RLC entity which is associated with the first MAC entity, and the second BSR for the second eNB includes the amount of data available for transmission in the second RLC entity which is associated with the second MAC entity.

10. The UE according to claim 6, wherein:
when data becomes available for transmission in the first RLC entity, the first RLC entity indicates to the first MAC entity the amount of data for transmission in the first RLC entity; and
when data becomes available for transmission in the second RLC entity, the second RLC entity indicates to the second MAC entity the amount of data for transmission in the second RLC entity.

* * * * *